(No Model.)

J. P. PETERSON.
GRAIN DUMP.

No. 483,011. Patented Sept. 20, 1892.

WITNESSES:
Chas. Niola.
C. Sedgwick

INVENTOR
J. P. Peterson
BY
Munn & Co.
ATTORNEYS.

UNITED STATES PATENT OFFICE.

JOHN P. PETERSON, OF WORTHINGTON, MINNESOTA.

GRAIN-DUMP.

SPECIFICATION forming part of Letters Patent No. 483,011, dated September 20, 1892.

Application filed June 24, 1892. Serial No. 437,906. (No model.)

*To all whom it may concern:*

Be it known that I, JOHN P. PETERSON, of Worthington, in the county of Nobles and State of Minnesota, have invented a new and useful Improvement in Grain-Dumps, of which the following is a full, clear, and exact description.

My invention relates to an improvement in grain-dumps, and has for its object to provide a structure which will be simple, durable, and economic and so built that the pit to receive the grain need not be sunk in the ground, or at the most but a slight distance only, and, furthermore, whereby the parts of the structure will be so arranged that dust or foreign matter, fluid or solid, will not interfere with the action of the dump-timbers in cold weather.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
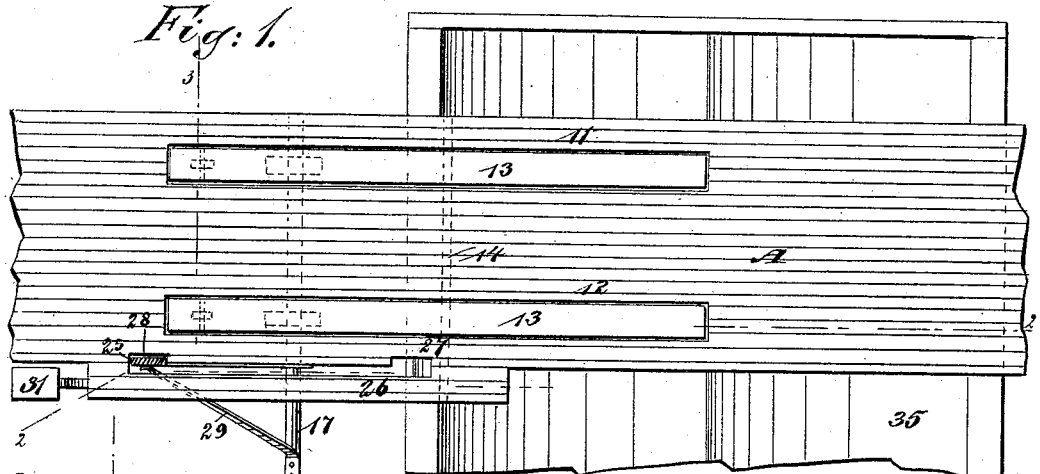
Figure 2:
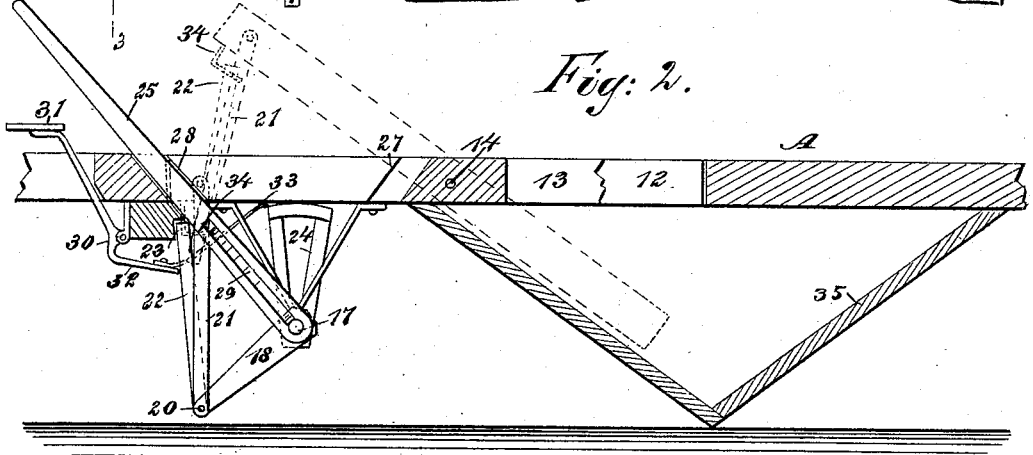
Figure 3:
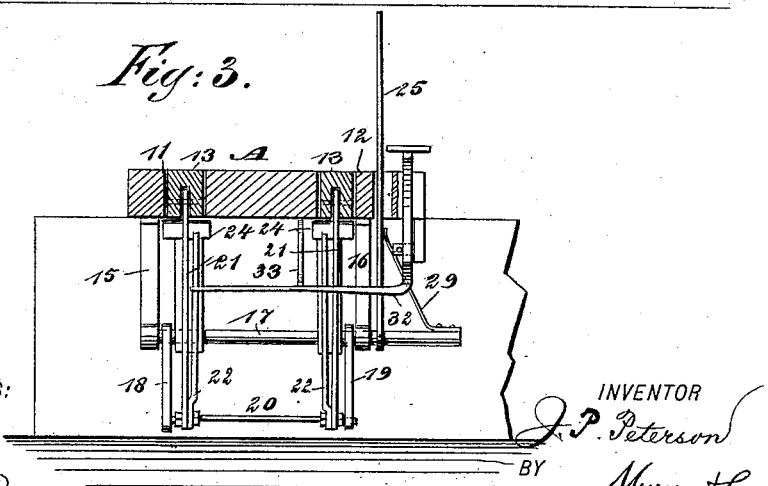

Figure 1 is a plan view of the dump. Fig. 2 is a longitudinal section taken, practically, on the line 2 2 of Fig. 1; and Fig. 3 is a transverse section taken, essentially, on the line 3 3 of Fig. 1.

A platform A of any desired length and width is mounted upon standards or other supports in a manner to cause the platform to be at an elevation from the ground. The platform may be approached at one end, and preferably is so approached, by means of a second platform, which is inclined, and the vehicle is drawn from the main platform over a second auxiliary platform, also inclined and located at the opposite end, or the approach and departure may be made in any other approved manner. The auxiliary platforms being of the ordinary construction are not illustrated.

In the platform two parallel and spaced longinal openings are produced, (designated as 11 and 12,) and in each of these openings a dump-timber 13 is pivoted, the timbers being usually fulcrumed by passing a single pin 14 through the timbers, through the slots and the platform transversely of the latter, as is best shown in Figs. 1 and 2. Beneath the platform two brackets 15 and 16 are secured, the location of the brackets being such that a shaft 17, journaled in their lower ends, will extend transversely beneath the platform A and beneath the rear ends of the dump-timbers.

Upon the shaft 17 two arms 18 and 19 are rigidly secured, the arms normally extending downward and rearward, as shown in Fig. 2, and one of the arms is located near each end of the shaft between the brackets 15 and 16. The lower ends of the arms are ordinarily connected by a rod 20, and to this rod, adjacent to each of the arms 18 and 19, the lower end of a connecting-rod 21 is pivotally secured, the upper ends of the connecting-rods being pivotally attached to the dump-timbers 13, one connecting-rod being secured to each dump-timber.

Adjacent to each of the connecting-rods 21 a link 22 is pivotally attached to the cross-bar 20 and these links extend upward, being free at their upper ends. When the dump-timbers are in their normal or horizontal position, the upper ends of the links 22, which may be termed "latch-links" or "latches," enter recesses 23, produced in a cross-beam beneath the platform, as shown best in Fig. 2, and while the link-latches are in these recesses the dump-timbers are maintained in their horizontal position and cannot be moved therefrom.

The shaft 17 is provided with two counterpoise-weights 24, one being located near each link 18 and 19, and these weights practically counterbalance the connecting-rods, links, and dump-timbers. One end of the shaft 17 has secured to it a lever 25, and this lever extends upward between one side edge of the platform and a guard-yoke 26, attached at that edge, as shown in Fig. 1, and the depressions or recesses 27 and 28 are formed in the side of the platform inclosed by the yoke, the recesses being inclined in opposite directions, as shown in Fig. 2. When the lever is in the rear recess 28, the dump-timbers will be closed or in their horizontal position, while they will be elevated and maintained so when the lever enters the opposite recess 27. The lever is forced into the recesses 27 and 28 and held therein by a spring 29, bearing against the outer face of the lever and which is attached to an outer end of the shaft 17.

Before the dump-timbers can be elevated or carried to an inclined position, which latter position they must assume when the load is to be dumped from a vehicle, it is necessary that the latches 22 should be removed from their keepers, which keepers are the recesses 23, and to that end a foot-lever 30 is fulcrumed beneath the platform at the side at which the lever is located, and the foot-lever extends upward above the platform, terminating at its upper end in a foot-plate 31. The lower end of the lever is carried inward, producing thereby a foot 32, and this foot has bearing against the latches 22. The foot-lever 30 is normally held out of engagement with the latches through the medium of a spring 33. (Best shown in Fig. 2.) The keepers of the latches are immediately beneath the dump-timbers 13, and in front of the keepers 23 a bracket 34 (shown in dotted lines, Fig. 2) is attached to the lower face of each of the dump-timbers, and when the latches are carried out of their keepers they enter these brackets and remain therein while the timbers are elevated, falling into their keepers through gravitation when the timbers are lowered to their horizontal position.

A hopper or pit 35 is constructed beneath the platform, extending partially under the dump-timbers at their forward ends, and ordinarily the rear wall of the pit or hopper is located slightly rearward of the fulcrum of the dump-timbers. The hopper, as is shown in Fig. 2, is somewhat V-shaped in cross-section; but its cross-sectional contour may be changed at will; and when the dump-timbers are carried downward to their inclined position their forward ends enter the hopper, so that the load dumped is conveyed directly into the hopper, and there is but little danger of any of the load being lost.

In operation the vehicle is driven, for instance, upon the platform A from the rear, and when its wheels have passed over upon the dump-timbers 13 the foot-lever is pressed downward, and by means of the lever 25 the shaft 17 is rocked and the timbers, including the vehicle, are given a downwardly-inclined direction, and the load is deposited thereby in the hopper 35. The vehicle and the timbers are then restored to their normal or horizontal position, and the vehicle may be driven off at the opposite or forward end of the platform.

The grain-dump is exceedingly simple. It comprises but very few parts, and they are durable and so arranged that they will not get out of order, even under very hard usage. Furthermore, as the platform is elevated from the ground the action of the dump-timbers is not interfered with, even in the winter-time, by foreign matter, liquid or solid, freezing around them, as at each action they will free themselves, and but little foreign matter will remain between the sides of the dump-timbers and the sides of the recesses in which they have movement.

Having thus described my invention, I claim as new and desire to secure by Letters Patent—

1. In a grain-dump, the combination, with a platform provided with openings therein and dump-timbers pivoted in said openings, of a shaft beneath the platform and provided with arms connected with the dump-timbers, a lever for operating the shaft, and locking latches pivotally connected with the arms of the said shaft and engaging the platform, substantially as and for the purpose set forth.

2. In a grain-dump, the combination, with a platform elevated from the ground and provided with parallel openings therein and dump-timbers fulcrumed in said openings, of a shaft journaled beneath the platform near one end of the dump-timbers, ance-arms projecting from the shaft and connected with the dump-timbers near their ends, a spring-pressed lever attached to the shaft, latches connected with the shaft, keepers connected with the platform and receiving the latches, and a trip-lever adapted for engagement with the latches, as and for the purpose set forth.

3. In a grain-dump, the combination, with a platform supported above the ground and provided with longitudinal openings, a dump-timber fulcrumed in each of the openings, and a trough or pit located beneath one end of the dump-timbers, of a shaft journaled beneath the dump-timbers, arms connected with the shaft, said arms having link connections with the dump-timbers, a lever connected with the shaft, whereby the latter is turned, keepers carried by the platform, latches supported from the shaft and adapted to enter the keepers, and stirrup-brackets attached to the dump-timbers and also adapted to receive the latches, and a shifting-lever fulcrumed to a fixed support and adapted for engagement with the latches to trip them from their keepers into the stirrup-brackets of the dump-timbers, as and for the purpose set forth.

JOHN P. PETERSON.

Witnesses:
PETER THOMPSON,
FRANK SAXON.